(12) United States Patent
Steiner

(10) Patent No.: US 8,282,138 B2
(45) Date of Patent: Oct. 9, 2012

(54) CRIMP RING

(75) Inventor: Richard A. Steiner, East Haddam, CT (US)

(73) Assignee: Rostra Tool Company, Branford, CT (US)

( * ) Notice: Subject to any disclaimer, the term of this patent is extended or adjusted under 35 U.S.C. 154(b) by 347 days.

(21) Appl. No.: 12/592,129

(22) Filed: Nov. 19, 2009

(65) Prior Publication Data

US 2010/0156097 A1 Jun. 24, 2010

Related U.S. Application Data

(60) Provisional application No. 61/203,108, filed on Dec. 18, 2008.

(51) Int. Cl.
*F16L 33/00* (2006.01)
(52) U.S. Cl. .................. 285/256; 285/371; 285/382
(58) Field of Classification Search .................. 285/382, 285/371, 256, 293.1, 294.1, 331, 399, 901, 285/7, 94, 109, 140.1, 370, 920; 138/96 R, 138/96 T, 109, 155
See application file for complete search history.

(56) References Cited

U.S. PATENT DOCUMENTS

| | | | | |
|---|---|---|---|---|
| 724,129 A * | 3/1903 | Schrader | ............... | 285/256 |
| 2,011,452 A * | 8/1935 | Lutz | ............... | 285/371 |
| 2,284,754 A | 6/1942 | Mcgarry | ............... | 285/289.1 |
| 2,544,109 A * | 3/1951 | Richardson | ............... | 285/3 |
| 2,768,844 A | 10/1956 | Schadeberg | | |
| 2,955,322 A | 10/1960 | Hite | | |
| D234,847 S | 4/1975 | Hoffman | | |
| 4,042,262 A * | 8/1977 | Mooney et al. | ............... | 285/98 |
| 4,060,264 A | 11/1977 | Gajajiva | | |
| 4,166,485 A | 9/1979 | Wokas | | |
| D258,526 S | 3/1981 | Nederman | | |
| 4,690,434 A | 9/1987 | Schmidt | | |
| D292,308 S | 10/1987 | Beltran | | |
| 4,852,917 A | 8/1989 | Viall | | |
| 5,056,832 A | 10/1991 | Nagagawa et al. | | |
| D327,120 S | 6/1992 | Ambrosi | | |
| 5,176,412 A | 1/1993 | Washizu | | |
| 5,199,750 A | 4/1993 | Yang | | |
| 5,228,721 A * | 7/1993 | Whittle et al. | ............... | 285/23 |
| 5,267,464 A | 12/1993 | Cleland | | |
| D346,433 S | 4/1994 | Cooper | | |
| D379,493 S | 5/1997 | Woods | | |
| D423,307 S | 4/2000 | Dittmann, Jr. | | |
| 6,095,571 A | 8/2000 | MacDuff | | |
| 6,270,125 B1 | 8/2001 | Rowley et al. | | |
| 6,371,522 B1 | 4/2002 | Wolff | | |

(Continued)

OTHER PUBLICATIONS

"Standard Specification for Metal Insert Fittings Utilizing a Copper Crimp Ring for SDR 9 Cross-Linked Polyethylene (PEX) tubing" (6 pages) ASTM International Designation: F 1807-02a; Pennsylvania US (2002).

*Primary Examiner* — James Hewitt
*Assistant Examiner* — Jay R Ripley
(74) *Attorney, Agent, or Firm* — Cantor Colburn LLP

(57) ABSTRACT

An annular shaped crimp ring construction which incorporates two separate and distinct sections formed adjacent each other on the same annular member. In accordance with the present invention, the first section of the crimp ring comprises an axial length which is substantially greater than the axial length of the second section, with the first section also comprising a thickness which is substantially greater than the thickness of the second section.

14 Claims, 5 Drawing Sheets

U.S. PATENT DOCUMENTS

| | | |
|---|---|---|
| 6,457,718 B1 | 10/2002 | Quesada |
| 6,523,862 B1 | 2/2003 | MacDuff |
| 6,588,805 B2 * | 7/2003 | Persohn et al. ............... 285/305 |
| D484,577 S | 12/2003 | Brue et al. |
| D494,256 S | 8/2004 | Nortier |
| 6,783,160 B2 | 8/2004 | Rowley |
| D515,675 S | 2/2006 | Tremoulet et al. |
| 7,044,785 B2 | 5/2006 | Harwath et al. |
| 7,101,223 B2 | 9/2006 | Neumann et al. |
| 7,128,091 B2 | 10/2006 | Istre |
| 7,134,696 B2 * | 11/2006 | Poll ............................... 285/256 |
| D577,795 S | 9/2008 | Smith et al. |
| 7,464,969 B2 * | 12/2008 | Poll ............................... 285/242 |
| 2002/0005222 A1 * | 1/2002 | Esser ............................ 138/109 |
| 2003/0127855 A1 | 7/2003 | Heverly |
| 2003/0214133 A1 | 11/2003 | Robison et al. |
| 2003/0227169 A1 | 12/2003 | Fritze et al. |
| 2004/0021318 A1 | 2/2004 | Fritze et al. |
| 2006/0043692 A1 | 3/2006 | Cai et al. |
| 2008/0093817 A1 | 4/2008 | Russell |

\* cited by examiner ically achieved. However, these prior art crimp rings have
CRIMP RING

RELATED APPLICATIONS

This application claims priority to U.S. Provisional Application Ser. No. 61/203,108 filed Dec. 18, 2008 entitled CRIMP RING.

TECHNICAL FIELD

This invention relates to crimp rings and, more particularly, to crimp rings or clamping members for improving and expediting the coupling of tubing or conduits to pipes or fittings.

BACKGROUND ART

In various industries, particularly the plumbing industry, tubing or conduits made from synthetic materials have gained wide acceptance and broad applicability. In general, the synthetic material employed comprises plastic polymers or composites, with cross-linked polyethylene (PEX) being the most dominant, and water distribution systems being the most popular field in which these products are employed. Furthermore, due to the flexibility and strength provided by these products, a wide range of applications and end uses has evolved.

In order to enable the various industries, including the plumbing industry, to employ tubing or conduits made from synthetic materials, connection systems are required in order to assure that the synthetic tubing/conduits are securely affixed to any desired pipe, fitting, or the like employed in the overall distribution system. In this regard, various connectors, clamps, or crimp rings have been developed to provide the required leak-free, clamped engagement.

In most typical applications, the pipe or fitting on which the tubing/conduit is mounted incorporates a terminating end having a barbed surface, smooth surface, grooved surface or other alternate configuration. By advancing the tube/conduit onto the end of the pipe/fitting in peripherally surrounding relationship to the surface configuration, the desired engagement is achieved. However, in order to assure secure, trouble-free, leak-free mounted engagement of the tubing/conduit on the desired fitting or pipe, a fastening number is typically employed to assure the desired sealed engagement is achieved.

In order to provide an easily installed, convenient, effective, and inexpensive sealed connection of the tube/conduit with the fitting/pipe, annular shaped crimp or sealing rings are typically employed. In a typical installation, the crimp ring is mounted about the flexible tube/conduit adjacent the end of the tube/conduit mounted to the fitting/pipe. Once in position, the crimp ring is peripherally surrounded by a crimping tool which is employed to physically compress the crimp ring into the flexible tubing for causing the diameter of the crimp ring to be reduced and providing the desired secure, sealed, mounted engagement of the tubing to the fitting.

Although the use of crimp rings have generally provided reasonably successful results in achieving the desired secure, sealed mounted engagement of the flexible tubes to the desired fittings, problems often occur with the position of the crimp ring relative to the barbs or grooves formed on the outer surface of the fitting. In this regard, if the crimp ring is not properly positioned relative to the barbs or grooves formed on the fitting, leakage zones or areas often develop. As a result, additional labor is required to attempt to position the crimp ring in the desired location. However, precise positioning is often difficult to achieve.

Some prior art crimp rings have attempted to resolve this problem by providing crimp rings of various constructions and configurations. In one such prior art construction, the crimp ring incorporates a rolled end or flange which enables the crimp ring to be mounted to the end of the flexible tube or conduit. By constructing this prior art crimp ring with a sufficient overall length, the positioning of the crimp ring in alignment with the barbs or grooves of the fitting is automatically achieved. However, these prior art crimp rings have proven to be difficult to compress uniformly in order to provide the desired sealed inter-engagement. In addition, many of these prior art constructions require the use of non-standard crimping tools, thereby increasing the difficulty of their use and broad acceptability.

Therefore, it is a principal object of the present invention to provide a crimp ring construction which is virtually universally applicable and provides a rapid, easily achieved, sealed engagement of any desired tube or conduit with any desired fitting or pipe.

Another object of the present invention is to provide a crimp ring having the characteristic features described above wherein said crimp ring can be securely mounted in position using standard crimping tools.

A further object of the present invention is to provide a crimp ring having the characteristic features described above wherein said crimp ring is inherently flexible, enabling flexible tubes/conduits having a wide variety of diameters and thicknesses to be easily accommodated.

Other and more specific objects will in part be obvious and will in part appear hereinafter.

SUMMARY OF THE INVENTION

By employing the present invention, all of the drawbacks and difficulties encountered in the prior art constructions have been eliminated and an easily employed, easily positioned, universally applicable crimp ring construction is achieved. It has been found that by providing an annular shaped crimp ring construction which incorporates two separate and distinct sections formed adjacent each other on the same annular member, a unique crimp ring construction is achieved which is capable of overcoming all of the prior art difficulties.

In accordance with the present invention, the first section of the crimp ring comprises an axial length which is substantially greater than the axial length of the second section, with the first section also comprising a thickness which is substantially greater than the thickness of the second section. In this way, several unique attributes are realized and the prior art difficulties and drawbacks are eliminated.

In addition, in the preferred embodiment, the dual section crimp ring construction of the present invention also incorporates a terminating, rolled edge formed at one end thereof for enabling the crimp ring to be quickly and easily positioned in the precisely desired location. In order to achieve the goals of the present invention, the rolled edge is formed on the terminating end of the second section.

By employing the present invention, a crimp ring construction is achieved which comprises an annular shaped surface formed by a substantially cylindrical, hollow member extending between two opposed ends. In addition, the annular shaped outer surface of the crimp ring of the present invention comprises two separate and distinct sections, each of which comprises separate axial lengths and thicknesses. Preferably, the inside surface of the crimp ring is substantially uniform between the two opposed ends. In this way, the crimp ring of the present invention comprises an outer surface having a stepped configuration, defined by the two separate and distinct thicknesses of the two sections, with the major axial length thereof being formed as the first section which comprises the greater thickness and the second section having a substantially smaller or shorter axial length with a smaller or reduced thickness.

In addition, in the preferred embodiment, the first section is constructed with an axial length and wall thickness which is substantially equivalent to conventional crimp rings presently employed in the prior art. In this way, the first section of the dual section crimp ring of the present invention is capable of being employed using conventional crimping equipment. Furthermore, as is more fully detailed below, the second section of the crimp ring of the present invention enables the crimp ring to be quickly and easily positioned in the precisely desired location on the flexible tubing, while also being constructed in a manner which eliminates any interference with the compression of the first section onto the flexible tubing when mounted on the desired fitting.

By employing a rolled terminating edge at the end of the second section of the crimp ring of the present invention, the rolled end effectively incorporates a flange member radially extending inwardly. This inwardly extending flange defines a stop area for mounting the crimp ring to the end of the flexible tube or conduit in the precisely desired position. In this way, assurance is provided that the first section is automatically positioned on the flexible tubing in the precisely desired location.

By employing the crimp ring of the present invention, which is constructed in the manner detailed above, a highly effective, easily employed, and universally applicable crimp ring is realized. In this regard, the first section of the crimp ring, which comprises the longer axial length and greater thickness, is able to cooperate with virtually all standard crimping tools and is able to be easily compressed in position about the flexible tubing/conduit for enabling the crimp ring to securely affix and sealingly mount the flexible tubing/conduit to the desired fitting/pipe.

Due to the incorporation of the second section which comprises a shorter axial length and smaller thickness than the first section, the crimp ring of the present invention is able to be easily compressed using conventional crimping equipment since the second section provides virtually no resistance to the compressive forces. As a result, a universally applicable, easily employed crimp ring construction is achieved.

In a further alternate preferred embodiment of the present invention, the crimp ring construction incorporates an annular groove formed in the outer surface of the cylindrically shaped crimp ring, with the annular groove effectively separating the first section of the crimp ring from the second section of the crimp ring. By incorporating the annular groove and positioning the annular groove in the manner detailed above, additional flexibility is imparted to the crimp ring of the present invention, providing further ease and assurance that the first section of the crimp ring is completely independent and easily compressed whenever desired with virtually no resistance force being imposed thereon by the second section of the crimp ring. As a result of this construction, the crimp ring of the present invention completely eliminates all of the difficulties and drawbacks found in the prior art and provides the construction which satisfies all of the needs, goals, and desires of the industry in an easily produce, competitively priced product.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which.

DETAILED DISCLOSURE

Figure 1:
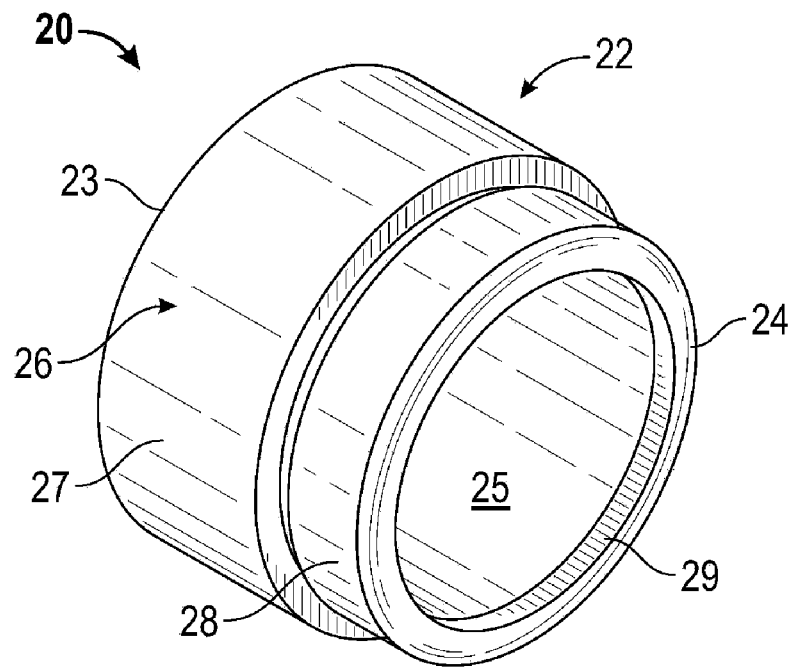
FIG. 1 is a rear perspective view of the Dual Section Crimp Ring in accordance with the present invention.
Figure 2:
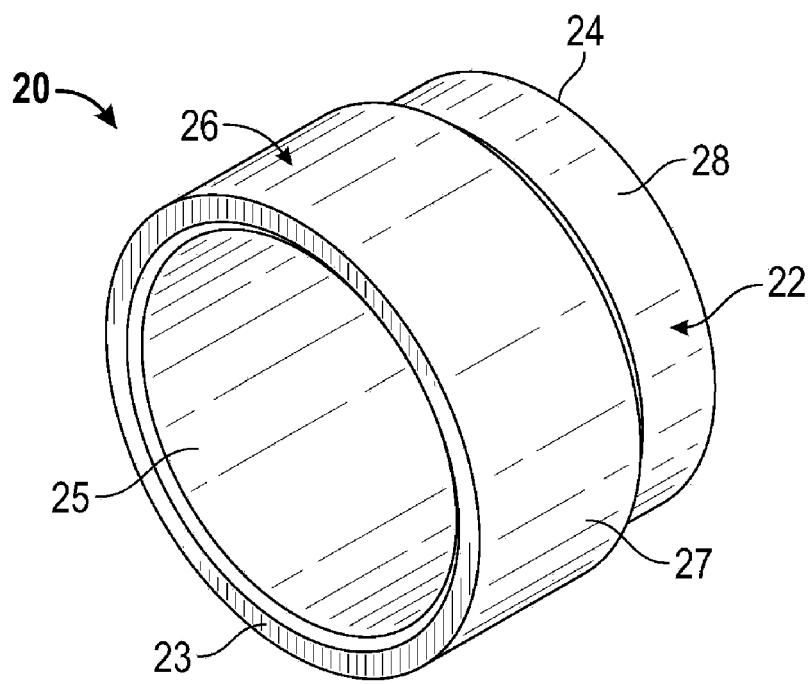
FIG. 2 is a front perspective view thereof.
Figure 4:
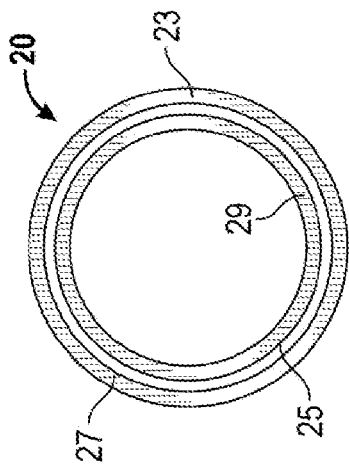
FIG. 4 is a front elevational view thereof.
Figure 3:
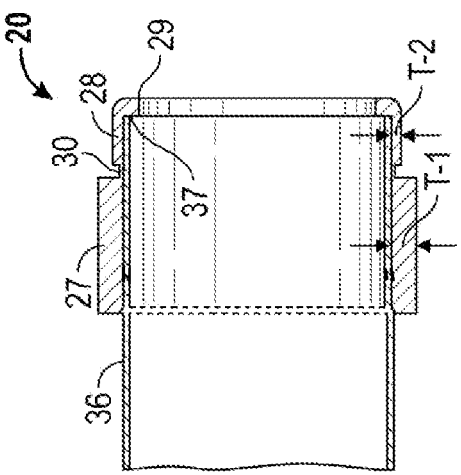
FIG. 3 is a rear elevational view thereof.

By referring to FIGS. 1-14, along with the following detailed discussion, the construction and operation of two alternate preferred embodiments of the present invention can best be understood. Although these drawings and this disclosure provides a full and complete discussion of these alternate embodiments of the present invention, further alternate embodiments, constructions, and configurations can be made without departing from the scope of this invention. Consequently, it is to be understood that the following detailed disclosure is provided for exemplary purposes only and any further alternate embodiments are intended to be within the scope of the present invention.

In FIGS. 1-8, one preferred embodiment of crimp ring 20 of the present invention is fully depicted. In this embodiment, crimp ring 20 is shown comprising substantially cylindrically shaped, hollow member 22 which incorporates first terminating end 23 and second terminating end 24. In addition, cylindrically shaped hollow member 22 incorporates a continuous, substantially smooth inside surface 25 and outside surface 26 which is defined by first section 27 and second section 28, each of which comprise separate and distinct thicknesses as well as separate and distinct axial lengths.

As a result of this construction, crimp ring 20 comprises a uniquely constructed, dual section, stepped configuration, defined by outside surface 26 and sections 27 and 28 thereof, with first section 27 comprising an axial length substantially greater than the axial length of second section 28. Furthermore, first section 27 comprises a thickness which is substantially greater than the thickness of second section 28.

Figure 6:
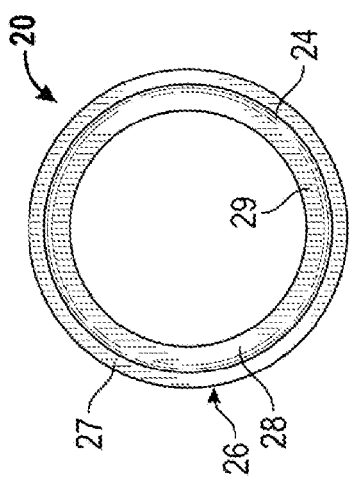
FIG. 6 is a cross-sectional side elevational view thereof, taken along line 6-7 of FIG. 3 and shown with flexible tubing mounted therewith.
Figure 5:
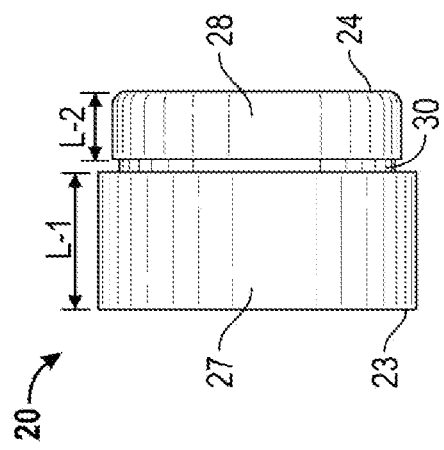
FIG. 5 is a side elevational view thereof.

As shown in FIG. 5, section 27 of crimp ring 20 comprises an axial length designated as L-1, while section 28 comprises an axial length designated as L-2. In addition, as shown in FIG. 6, section 27 comprises a thickness designated as T-1, while section 28 comprises a thickness designated as T-2.

In order to achieve the goals and objectives of the present invention, it has been found that length L-2 of section 28 comprises a dimension which ranges between about 33% and 77% of length L-1 of section 27. In addition, thickness T-2 of section 28 comprises a dimension which ranges between about 35% and 50% of thickness T-1 of section 27. By constructing crimp ring 20 with these dimensional parameters, a highly effective, easily employed, and efficient crimp ring construction is achieved.

Figure 7:
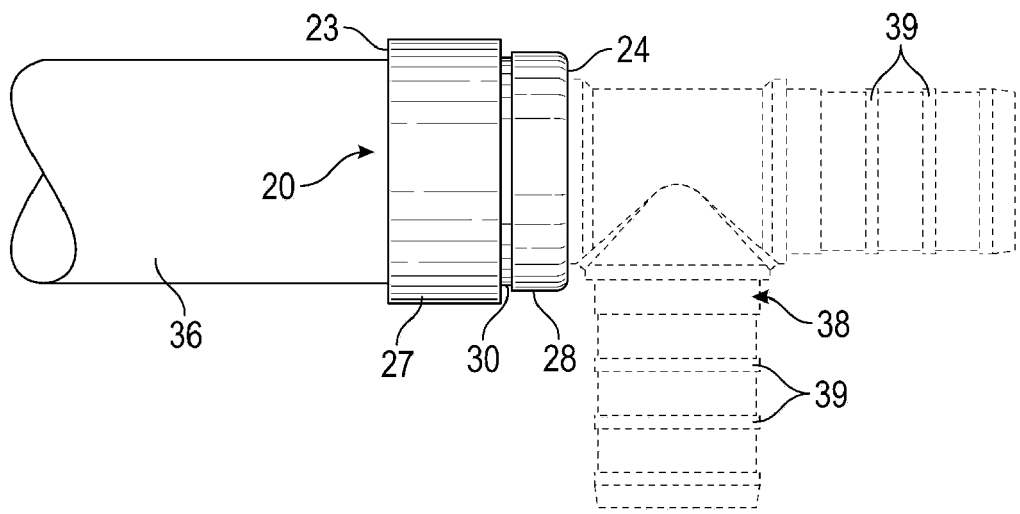
FIG. 7 is a side elevational view thereof showing the dual section crimp ring attaching flexible tubing to a connector.
Figure 8:
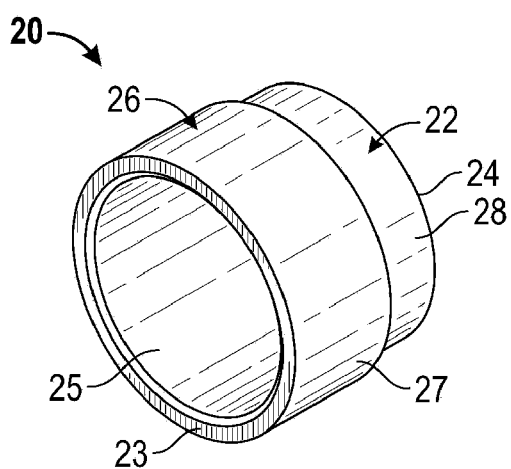
FIG. 8 is a rear perspective view of an alternate preferred embodiment of the Dual Section Crimp Ring of the present invention.
Figure 9:
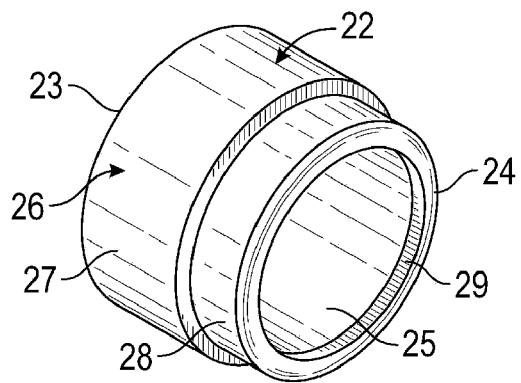
FIG. 9 is a front perspective view thereof.
Figure 10:
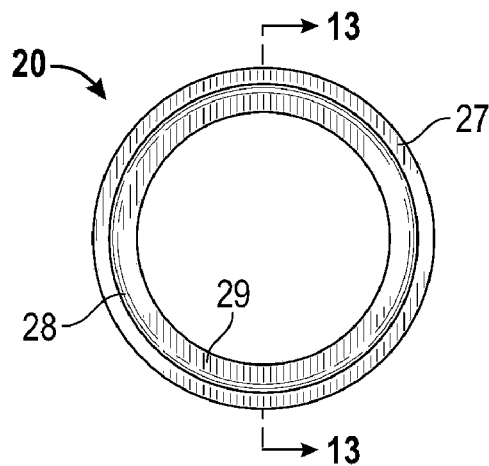
FIG. 10 is a rear elevational view thereof.
Figure 11:
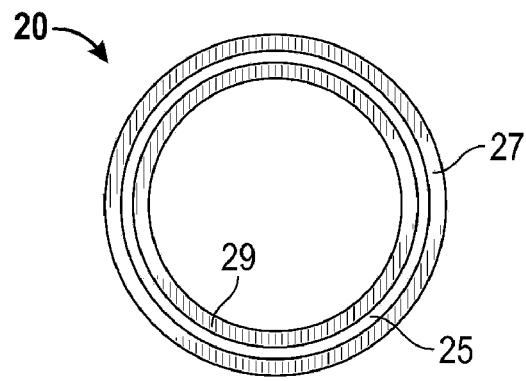
FIG. 11 is a front elevational view thereof.

Crimp ring 20 also comprises an inwardly extending flange 29 formed on terminating end 24 of cylindrically shaped hollow member 22. Typically, by roll forming terminating end 24, inwardly extending flange 29 is achieved. As shown in FIGS. 6 and 7, flange 29 provides a positive stop for terminating end 37 of flexible tubing 36 when crimp ring 20 is positioned in overlying engagement with flexible tubing 36 by telescopically advancing crimp ring 20 onto flexible tubing 36 prior to the securement of crimp ring 20 to flexible tubing 36 and fitting 38.

Finally, in this embodiment of the present invention, crimp ring 20 incorporates annular groove 30 which is formed in outer surface 26 of cylindrically shaped hollow member 22, effectively separating first section 27 from second section 28. As best seen in FIGS. 1, 5, 6, and 7, annular groove 30 is formed directly into outer surface 26, separating first section 27 from second section 28 and further enabling these sections to operate independently from each other.

In addition, in the preferred construction, groove 30 preferably comprises a depth ranging between about 45% and 55% of the thickness T-2 of section 28. By referring to FIGS. 8-14, along with the following detailed discussion, the construction and operation of the second preferred embodiment of the present invention can best be understood. Since the construction and operation of this alternate preferred embodiment is similar to the construction of the embodiment depicted in FIGS. 1-7 and discussed above, the identical reference numerals are employed for referring to the same elements or features. Although the following discussion summarizes the construction and operation of this alternate embodiment, the detailed disclosure provided above is incorporated herein by reference and should be employed for resolving any areas of detail which are not specifically discussed below.

In the second preferred embodiment, crimp ring 20 comprises substantially cylindrically shaped, hollow member 22 which incorporates the first terminating end 23 and second terminating end 24. In addition, cylindrically shaped hollow member 22 incorporates a continuous, substantially smooth inside surface 25 and outside surface 26 which is defined by first section 27 and second section 28, each of which comprises separate and distinct thicknesses.

In this embodiment, as with the embodiment detailed above, crimp ring 20 comprises a uniquely constructed, stepped configuration, defined by outside surface 26 and sections 27 and 28 thereof, with first section 27 comprising an axial length substantially greater than the axial length of second section 28. Furthermore, first section 27 comprises a thickness which is substantially greater than the thickness of second section 28.

Figure 12:
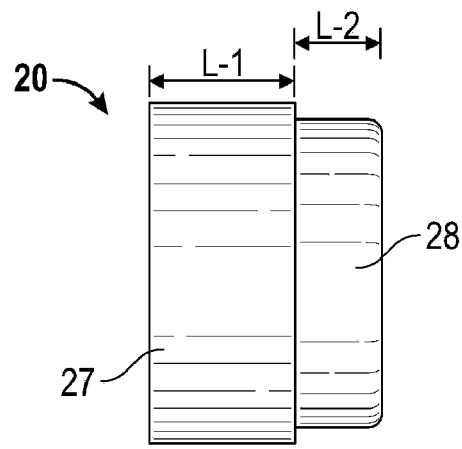
FIG. 12 is a side elevational view thereof.

As shown in FIG. 12, section 27 of crimp ring 20 comprises an axial length designated as L-1, while section 28 comprises an axial length designated as L-2. In addition, as shown in FIG. 12, section 27 comprises a thickness designated as T-1, while section 28 comprises a thickness designated as T-2.

In order to achieve the goals and objectives of the present invention, it has been found that length L-2 of section 28 comprises a dimension which is ranges between about 33% and 77% of length L-1 of section 27. In addition, thickness T-2 of section 28 comprises a dimension which ranges between about 35% and 50% of thickness T-1 of section 27. By constructing crimp ring 20 with these dimensional parameters, a highly effective, easily employed, and efficient crimp ring construction is achieved.

Figure 13:
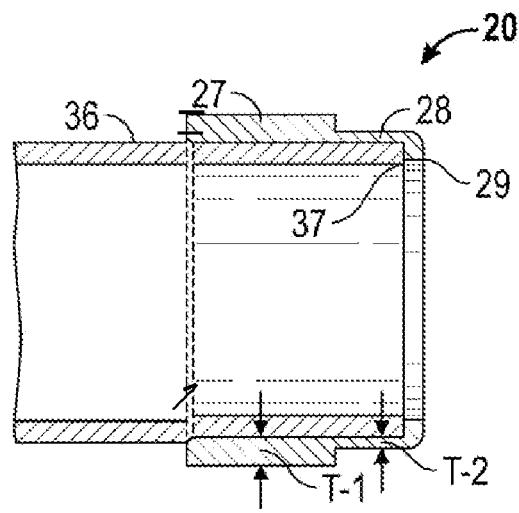
FIG. 13 is a cross-sectional side elevational view thereof, taken along line 13-13 of FIG. 10 and shown with flexible tubing mounted therewith.
Figure 14:
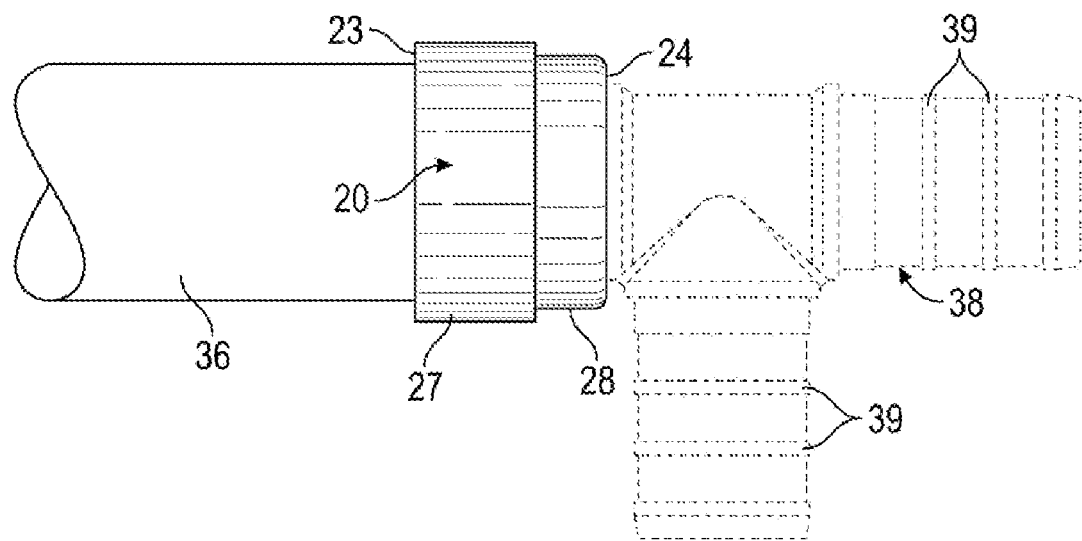
FIG. 14 is a side elevational view thereof showing the dual section crimp ring attaching a pipe to a connector.

Similarly, in this embodiment, crimp ring 20 also comprises an inwardly extending flange 29 formed on terminating end 24 of cylindrically shaped hollow member 22, by preferably roll forming terminating end 24. In this way, inwardly extending flange 29 is achieved. As shown in FIGS. 13 and 14, flange 29 provides a positive stop for terminating end 37 of flexible tubing 36 when crimp ring 20 is positioned in overlying engagement with flexible tubing 36 by telescopically advancing crimp ring 20 onto flexible tubing 36 prior to the securement of crimp ring 20 to flexible tubing 36 and fitting 38.

By employing the present invention, first section 27 is easily compressed by the desired crimping tool in order to securely affix flexible tubing 36 to fitting 38 in a manner which assures a leak-free interengagement. This desired leak-free interengagement is achieved by physically reducing the diameter of section 27 of crimp ring 20, thereby forcing flexible tubing 36 into affixed interengagement with radially extending ridges, ribs or barbs 39 of fitting 38. In this way, the desired leak-free interengagement is realized.

In order to quickly and easily obtain the desired affixation of crimp ring 20 to flexible tubing 36 and fitting 38, the jaws of the crimping tool are centered over section 27 of crimp ring 20 with the crimping jaws being held perpendicular to the axis of radially extending ridges, ribs, or barbs 39 of fitting 38. Then, the jaws of the crimping tool are closed around section 27 of crimp ring 20, compressing crimp ring 20 onto flexible tubing 36. Each crimp ring 20 is compressed only once and is checked to determine conformance to the after-crimped dimensional requirements.

By employing the present invention, crimp ring 20 is quickly and easily mounted on flexible tubing 36 with crimp ring 20 and tubing 36 being quickly and easily mounted to any desired fitting 38. In addition, due to the construction of section 28 of crimp ring 20, section 27 is automatically positioned in the precisely desired location relative to ridges, bars, or flanges 39 of fitting 38, in order to assure secure, sealed interengagement of tubing 36 with fitting 38. In this regard, length L-2 of section 28 of the crimp ring 20 is constructed to assure that length L-1 of section 27 is placed in direct alignment with ridges, barbs, or flanges 39 of fitting 38 to provide the desired sealed interengagement of tubing 36 with fitting 38 whenever section 27 is crimped in the desired manner.

Furthermore, regardless of the embodiment of crimp ring 20 which is employed, the construction of section 27 and section 28, as detailed above, provides assurance that section 27 of crimp ring 20 is easily compressed by conventional crimping equipment with the same speed and efficiency presently obtainable using conventional, single section crimp ring members. It has been found that by constructing section 28 of crimp ring 20, in the manner detailed above, section 28 imparts virtually no resistance or added force requirements for crimping section 27 in the conventional manner.

By incorporating section 28, automatic positioning of section 27 in the precisely desired location is achieved, with speed, efficient, and consistent repeatable accuracy being realized. As a result, all of the drawbacks and difficulties encountered using prior art constructions have been eliminated and a highly effective, efficient, and easily employed crimp ring construction is achieved.

In the preferred construction, crimp ring 20 is constructed from copper material in order to provide the desired compressive flexibility. However, although copper is preferable, crimp ring 20 may comprise other materials, either in whole or in part, which materials are selected from the group consisting of brass, soft metals, plastics, and malleable materials.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what I claim as new and desire to secure by Letters Patent is:

1. A crimp ring configured to couple a tube member about at least two radially extending circumferential protrusions on a fitting, the at least two protrusions being spaced a distance apart, the crimp ring comprising:
    a cylindrical first section having a first axial length, a first thickness and a first outer diameter, the first thickness being substantially constant along the first axial length;
    a cylindrical second section adjacent the first section, the second section having a second axial length, a second thickness and a second outer diameter, the second axial length being smaller than the first axial length, the second thickness being smaller than the first thickness, and the second outer diameter being smaller than the first outer diameter, the second thickness being substantially constant along the second axial length;
    a first opening extending through the first section and the second section, the first opening having a first diameter sized to receive the tube member; and,
    a stop flange arranged on an end of the second section opposite the first section, the stop flange extending radially inward to define a second opening, the second opening having a second diameter smaller than the first diameter;
    wherein the stop flange includes an inner surface, the inner surface being configured to contact an end of the tube member;
    further comprising a groove disposed between the first section and the second section, the groove having a third outer diameter, the third outer diameter being smaller than the second outer diameter; and
    the cylindrical first section adjoins the groove and the groove adjoins the cylindrical second section.

2. The crimp ring of claim 1 wherein the inner surface is substantially perpendicular to the first opening.

3. The crimp ring of claim 1 wherein the first axial length is greater than the distance.

4. The crimp ring of claim 1 wherein crimp ring is made from a material comprising at least one selected from the group consisting of copper, brass, soft metals, plastics, and malleable materials.

5. The crimp ring of claim 1 wherein the second axial length ranges between about 33% and 77% of the first axial length.

6. The crimp ring of claim 5 wherein the second thickness ranges between about 35% and 50% of the first thickness.

7. The crimp ring of claim 6 wherein the groove has a depth ranging between about 45% and 55% of the second thickness.

8. A crimping system comprising:
    a fitting having a first end having at least two radially extending circumferential protrusions spaced apart by a distance;
    a tube member having a first inner diameter disposed over the at least two protrusions, the tube member having a second end; and,
    a crimp ring disposed about the tube member radially opposite the at least two protrusions comprising:
    a cylindrical first section having a first axial length, a first thickness and a first outer diameter;
    a cylindrical second section adjacent the first section, the second section having a second axial length, a second thickness and a second outer diameter, the second axial length being smaller than the first axial length, the second thickness being smaller than the first thickness, and the second outer diameter being smaller than the first outer diameter, wherein the second axial length is sized to position the first section about the at least two protrusions;
    a first opening having a first inner diameter extending through the first section and the second section and disposed about the tube member; and,
    a stop flange arranged on an end of the second section opposite the first section and in contact with the tube member, the stop flange extending radially inward to define a second opening having a second inner diameter that is smaller than the first inner diameter;
    wherein the stop flange includes an inner surface, the inner surface in contact with an end of the tube member;
    further comprising a groove disposed between the first section and the second section, the groove having a third outer diameter, the third outer diameter being smaller than the second outer diameter; and
    the cylindrical first section adjoins the groove and the groove adjoins the cylindrical second section.

9. The crimp ring of claim 8 wherein the inner surface is substantially perpendicular to the first opening.

10. The crimp ring of claim 8 wherein crimp ring is made from a material comprising at least one selected from the group consisting of copper, brass, soft metals, plastics, and malleable materials.

11. The crimp ring of claim 8 wherein the second section is movable between a first position and a second position, wherein when in the second position, the first opening positions the tube member onto the at least two protrusions.

12. The crimp ring of claim 11 wherein the second axial length ranges between about 33% and 77% of the first axial length.

13. The crimp ring of claim 12 wherein the second thickness ranges between about 35% and 50% of the first thickness.

14. The crimp ring of claim 13 wherein the groove has a depth ranging between about 45% and 55% of the second thickness.

* * * * *